(12) United States Patent
Feijoo et al.

(10) Patent No.: US 11,128,625 B2
(45) Date of Patent: *Sep. 21, 2021

(54) IDENTITY MANAGEMENT CONNECTING PRINCIPAL IDENTITIES TO ALIAS IDENTITIES HAVING AUTHORIZATION SCOPES

(71) Applicant: Citrix Systems, Inc., Fort Lauderdale, FL (US)

(72) Inventors: Ricardo Fernando Feijoo, Davie, FL (US); Thomas Michael Kludy, Cooper City, FL (US)

(73) Assignee: Citrix Systems, Inc., Fort Lauderdale, FL (US)

(*) Notice: Subject to any disclaimer, the term of this patent is extended or adjusted under 35 U.S.C. 154(b) by 127 days.

This patent is subject to a terminal disclaimer.

(21) Appl. No.: 16/550,656

(22) Filed: Aug. 26, 2019

(65) Prior Publication Data
US 2019/0386997 A1    Dec. 19, 2019

Related U.S. Application Data

(63) Continuation of application No. 15/482,904, filed on Apr. 10, 2017, now Pat. No. 10,440,024.

(51) Int. Cl.
*G06F 21/00* (2013.01)
*H04L 29/06* (2006.01)

(52) U.S. Cl.
CPC ........... *H04L 63/10* (2013.01); *H04L 63/083* (2013.01); *H04L 63/0414* (2013.01); *H04L 63/102* (2013.01); *H04L 63/105* (2013.01)

(58) Field of Classification Search
CPC ... H04L 63/10; H04L 63/083; H04L 63/0414; H04L 63/102; H04L 63/105
See application file for complete search history.

(56) References Cited

U.S. PATENT DOCUMENTS

| 8,190,884 B2 | 5/2012 | Alroy et al. |
| 9,330,280 B2 | 5/2016 | Rachalwar et al. |

(Continued)

OTHER PUBLICATIONS

Savvas, Anthony, "Cloud-Based Identity Management Takes Off with Okta Boosting Venture Capital Race"; Forbes, Oct. 11, 2013; http://www.forbes.com/sites/antonysavvas/2013/10/11/cloud-based-identity-management-takes-off-with-okta-boosting-venture-capital-race/ article accessed on Jun. 8, 2017; 4 pages.

*Primary Examiner* — Alexander Lagor
(74) *Attorney, Agent, or Firm* — BainwoodHuang

(57) ABSTRACT

A principal database is described in which each entry includes one principal identity, and one or more alias identities that may each have an authorization scope. Principal identity attributes include a principal identifier and login credentials, and alias identity attributes include an authorization scope and login credentials. Responsive to successfully authenticating the user for a first application (a multiple-identity application), based on the alias identity login credentials, an access token containing both the alias identity attributes and the principal identity attributes is transmitted to the first application, causing the first application to grant a scope of access based on the authorization scope. Responsive to a request to authenticate the user for a second application (a single-identity application), the access token is transmitted to the second application without re-authenticating the user, causing the second application to grant a scope of access based on the principal identifier.

25 Claims, 8 Drawing Sheets

(56) References Cited

U.S. PATENT DOCUMENTS

| | | | |
|---|---|---|---|
| 9,467,457 | B2 | 10/2016 | Si et al. |
| 9,477,832 | B2 | 10/2016 | Cross et al. |
| 9,536,065 | B2 | 1/2017 | Bouse et al. |
| 9,548,976 | B2 | 1/2017 | Belote et al. |
| 9,565,297 | B2 | 2/2017 | Maes |
| 9,569,634 | B1 | 2/2017 | Yanacek et al. |
| 9,654,572 | B2 | 5/2017 | Connelly et al. |
| 9,660,989 | B1 | 5/2017 | Fredinburg et al. |
| 9,674,180 | B2 | 6/2017 | Maes |
| 2010/0088753 | A1* | 4/2010 | Ayres .................... G06F 21/41 726/9 |
| 2010/0281530 | A1 | 11/2010 | Tarkoma |
| 2016/0087960 | A1 | 3/2016 | Pleau et al. |
| 2017/0012784 | A1 | 1/2017 | Cross et al. |

\* cited by examiner

IDENTITY MANAGEMENT CONNECTING PRINCIPAL IDENTITIES TO ALIAS IDENTITIES HAVING AUTHORIZATION SCOPES

TECHNICAL FIELD

The present disclosure relates generally to the technical field of cyber security in networked computer systems, and more specifically to an identity management system that connects principal identities to alias identities having authorization scopes, for use by a set of secure applications that control protected resources.

BACKGROUND

As it is generally known, identity management systems are used to create, maintain, and manage identity information for users, and to provide user authentication on behalf of other applications. An identity management system operates by performing an authentication process with regard to a user, and then, in response to successful authentication of the user, generating a security token that can be presented to one or more applications that trust the identity management system, during processing of user requests to access protected resources. A security token generated by an identity management system may include items of identity information about the user, sometimes referred to as "claims", that are inserted by the identity management system into the token based on information maintained by the identity management system. Systems that trust the identity management system to perform authentication and to reliably generate a security token use the token to make authorization decisions with regard to protected resources under their control.

SUMMARY

An identity management system is described herein that connects principal identities to alias identities that may have authorization scopes, and that performs user authentication on behalf of a set of secure applications that control access to protected resources. In one aspect, a principal database is provided in which each entry is associated with a respective user of a set of secure applications. Each entry in the principal database includes one principal identity, and may additionally store one or more alias identities for its respective user. Each alias identity may have one or more authorization scopes.

For example, an entry in the principal database may be created for a given user by storing a principal identity and an alias identity into the entry. The principal entity has principal identity attributes that include a principal identifier and login credentials, and the alias identity has alias identity attributes that include an authorization scope and login credentials. In response to successfully authenticating the user on behalf of a first secure application based on the login credentials for the alias identity, an access token is generated that contains both the alias identity attributes and the principal identity attributes. The access token is transmitted to an authorization endpoint in the first secure application. The access token causes the authorization endpoint in the first secure application to grant, based on the authorization scope of the alias identity, a scope of access to protected resources in the first secure application. The authorization endpoint in the first secure application grants different scopes of access in response to different authorization scopes that it receives in access tokens, and is referred to herein for purposes of explanation as a "multiple-identity" application.

In response to receiving a request to authenticate the user on behalf of a second secure application, and without authenticating the user based on the login credentials for the principal identity, the access token is transmitted to an authorization endpoint in a second secure application. The access token causes the authorization endpoint in the second secure application to grant, based on the principal identifier of the principal identity, a scope of access with regard to protected resources in the second one of the secure applications. The second secure application may associate multiple authorization scopes with an individual principal identity that is uniquely associated with an individual user, and is referred to herein for purposes of explanation as a "single-identity" application.

In another aspect, the authorization endpoint in the second secure application determines a scope of access to grant with regard to the protected resources in the second secure application by first identifying, in the authorization endpoint in the second secure application, multiple authorization scopes that are associated with the principal identity. The authorization endpoint in the second secure application may then prompt the user to select one of the authorization scopes associated with the principal identity, and grant a scope of access with regard to protected resources in the second secure application that is associated with the authorization scope that was selected by the user.

In another aspect, the authorization scope for the alias identity may be an authorization scope for a group of users that includes the user. The authorization endpoint in the first secure application may maintain a scope of access (e.g. based on access rights stored in the authorization endpoint and associated with the authorization scope) that is granted to each member of the group of users in response to receipt of an access token that contains the authorization scope for the group. For example, the group of users may consist of employees of a specific business organization that is one of multiple business organizations that use the first secure application, and the scope of access that is granted to each member of the group, in response to receipt of an access token containing the authorization scope, may provide access to a set of protected resources in the first secure application that are accessible only to employees of that business organization. In one example, the protected resources in the first secure application may be electronic documents, and the set of protected resources in the scope of access granted to each member of the group may be electronic documents in the first secure application that are accessible only to employees of that specific business organization.

Alternatively, for example, an authorization scope may be for a group of users who are each located in a specific geographic region. The scope of access granted to each member of the group, in response to receipt of an access token that contains the authorization scope, may provide access to a set of protected resources in the first secure application that are accessible only to users that are located in that specific geographic region. In an example in which the protected resources in the first secure application are electronic documents, the set of the protected resources in the first secure application to which access is granted may be electronic documents in the first application that are accessible only to users who are located in the specific geographic region.

In another aspect, the alias identity may be stored in the entry at a time when the user is accessing the first secure application, e.g. the alias identity may be added to the entry when the user initially requests access to the first secure application. In such a case, the authentication scope for the alias identity may be received from the first secure application, and storing the alias identity in the entry may include storing the authentication scope received from the first secure application into the entry that is being created or modified. When the user is subsequently authenticated on behalf of the first secure application, based on the login credentials for the alias identity, e.g. when the user subsequently requests access to the first secure application at a later time, the same authorization scope that was received from the first secure application is stored into the access token and sent to the first secure application.

In another aspect, a unique anchor attribute may be stored in the principal attributes, and the user must be verified based on the unique anchor attribute prior to any modifications are made to the entry, including when any alias identities are added to the entry after the entry is created. For example, the unique anchor attribute may be a verified electronic mail address of the user, and prior to any modifications to the entry the user must be verified by sending an electronic mail message to the verified electronic mail address, the message containing a verification link to be selected by the user (e.g. to be clicked on by the user), and then detecting that the user has selected (e.g. clicked on) the link contained in the electronic mail message.

In another aspect, multiple alias identities may be stored into the entry for the user, and each of the alias identities in the entry may have alias identity attributes that include different login credentials. To allow the user to conveniently manage all the attributes in the entry, an identity management user interface may be displayed to the user, through which the user can conveniently and simultaneously modify both the principal identity attributes and the alias identity attributes of each one of the multiple alias identities stored in the entry.

BRIEF DESCRIPTION OF THE DRAWINGS

The foregoing and other objects, features and advantages will be apparent from the following description of particular embodiments, as illustrated in the accompanying drawings in which like reference characters refer to the same parts throughout the different views. The elements of the drawings are not necessarily drawn to scale, emphasis instead being placed upon illustrating the principles of the various embodiments.

DETAILED DESCRIPTION

Figure 1:
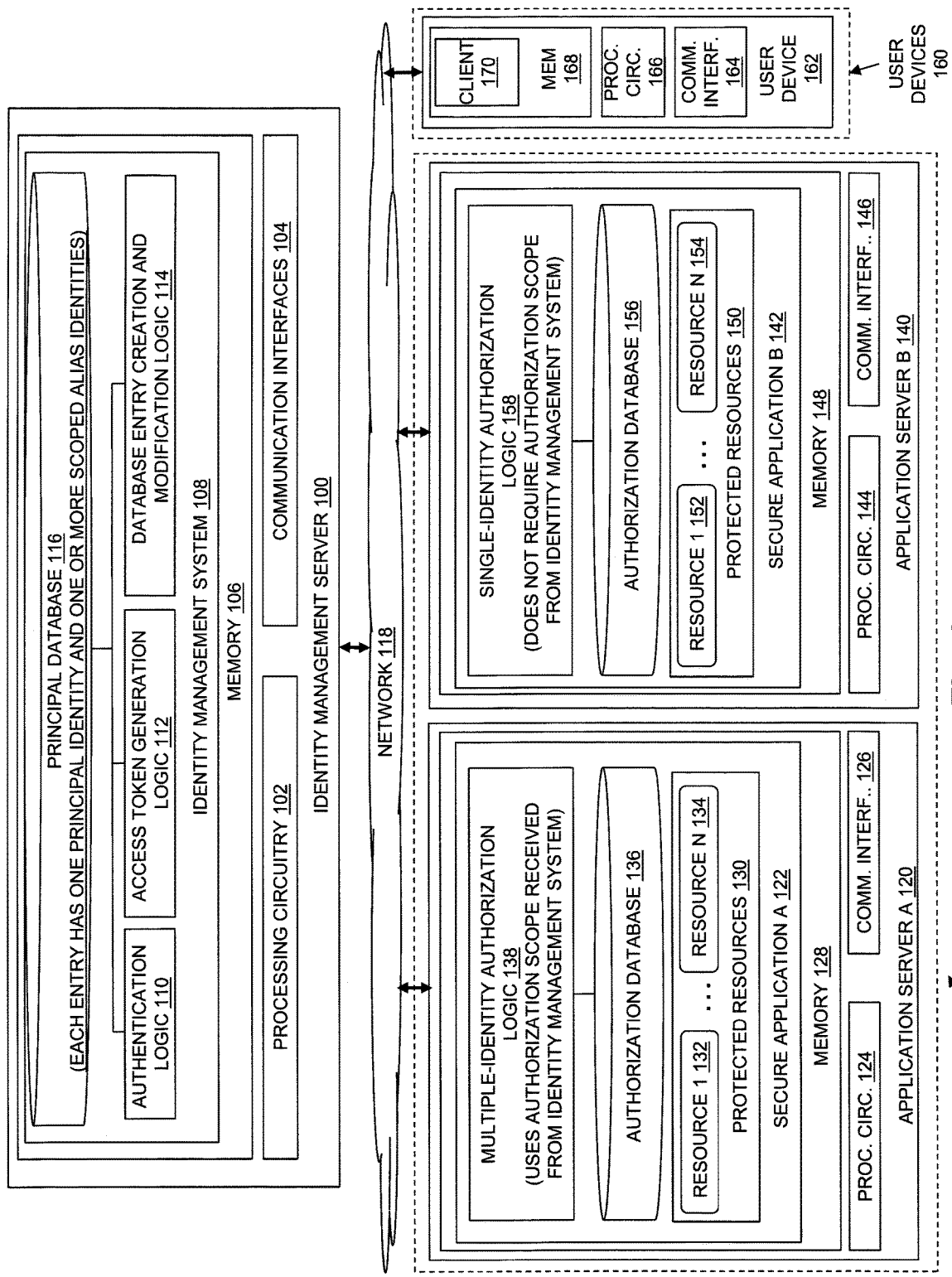
FIG. 1 is a block diagram showing an example of devices in an operational environment of an illustrative embodiment.

Embodiments will now be described with reference to the figures. It should be understood that such embodiments are provided only by way of example and to illustrate various features and principles, and that the scope of the claims is not limited to the examples of specific embodiments described herein.

The individual features of the particular embodiments, examples, and implementations described herein can be combined in any manner that makes technological sense. Moreover, such features are hereby combined to form all possible combinations, permutations and variants except to the extent that such combinations, permutations and/or variants have been explicitly excluded or are technically impractical. Support for such combinations, permutations and variants is considered to exist in this document.

Previous approaches to identity management have exhibited significant shortcomings. Previous "single-identity" identity management systems have operated by maintaining a single identity for each user. However, increasing numbers of secure applications have been developed that grant different access rights to a user based on the specific credentials that the user uses to authenticate. These applications may be referred to as "multiple-identity" systems, and cannot be supported simply by using existing "single-identity" identity management systems. In another shortcoming, identity management systems used by multiple-identity systems have not tied together the multiple-identities of individual users in a way that could be used by single-identity systems. As a result of the incompatibilities between previous single-identity and multiple-identity approaches, a user of secure applications that include both single-identity and multiple-identity applications has often been required to login multiple times when switching between single-identity and multiple-identity applications, and to independently manage multiple sets of login credentials across separate identity databases used by independently operating single-identity and multiple-identity systems.

To address the above described and other shortcomings arising in previous identity management technology, new technology is described herein for performing user authentication on behalf of both single-identity and multiple-identity secure applications, that connects individual principal identities to multiple alias identities that may each have different authorization scopes. The technology described herein provides significant advantages over previous solutions. First, the disclosed technology simultaneously supports authentication and authorization for both multiple-identity and single-identity secure applications. As a result, a user of secure applications that include both single-identity and multiple-identity applications can be provided with a single sign-on experience that eliminates the requirement of repeatedly logging in when switching between multiple-identity and single-identity secure applications. In addition, the user can conveniently access and modify multiple sets of login credentials associated with both multiple-identity and single-identity systems simultaneously through a user interface that accesses a single database entry associated with the user.

FIG. 1 is a block diagram showing an example of devices in an operational environment of an illustrative embodiment.

An Identity Management Server 100, Application Servers 102 and User Devices 160 are communicably connected via one or more computer networks, shown by Network 118. Identity Management Server 100 includes Processing Circuitry 102, Communication Interfaces 104, and Memory 106. Communication Interfaces 104 may include one or more network interfaces and/or interfaces to I/O devices, that enable Identity Management Server 100 to communicate over one or more computer networks, including Network 118. Processing Circuitry 102 may include one or more computer processors, such as a central processing unit (CPU) or microprocessor, and associated circuitry. Memory 106 may include volatile memory (e.g., RAM) and/or non-volatile storage, and/or another type of computer readable medium, that is operable to store program code that is executable on the Processing Circuitry 102, and that may be operable to store data operated on by such program code. Although certain software constructs are specifically shown in FIG. 1, Memory 106 may also include other software constructs, which are not shown, such as an operating system and/or various other applications, and/or middleware, utilities, libraries, etc.

In the embodiment shown in FIG. 1, Memory 106 of Identity Management Server 100 stores an Identity Management System 108 that includes a Principal Database 116 and program code such as Authentication Logic 110, Access Token Generation Logic 112, and Database Entry Creation and Modification Logic 114. Each entry in Principal Database 116 is uniquely associated with a corresponding individual user in a set of users that use a set of secure applications that execute on Application Servers 102. Each entry in Principal Database 116 includes a single principal identity and one or more alias identities that are all associated with the corresponding user, and each alias identity may have an authorization scope associated with it. For a given user, the alias identities in the corresponding entry are used to access protected resources located in one or more multiple-identity secure applications executing on the Application Servers 102, based on their associated authorization scopes, and the principal identity in the corresponding entry is used to access protected resources located in one or more single-identity secure applications executing on the Application Servers 102. Authentication Logic 110 is operable when executed to authenticate users, on behalf of the secure applications executing on Application Servers 102, through clients executing on the User Devices 160 (e.g. Client 170), when access is requested to the secure applications executing on Application Servers 102. Access Token Logic 112 is operable when executed to generate an access token when a user is successfully authenticated, containing attributes from the entry for the user in the Principal Database 116, and to send the access token to one or more of the secure applications executing on Application Servers 102, for use by authorization logic in the secure applications to determine a scope of access that is to be granted with regard to one or more protected resources in the secure applications.

Database Entry Creation and Modification Logic 114 is operable when executed to create an entry in Principal Database 116, and/or to modify the contents of an entry in Principal Database 116. In some embodiments, multiple alias identities may be stored into a user's entry in the Principal Database 116, and each of the alias identities in the entry may have alias identity attributes that include different login credentials. To allow the user to conveniently manage all the attributes in the entry, including the different sets of login credentials, Database Entry Creation and Modification Logic 114 may generate an identity management user interface that is displayed to the user through Client 170, and through which the user can conveniently and simultaneously modify both the principal identity attributes and the alias identity attributes of each one of the multiple alias identities stored in the user's principal database entry.

Application Servers 102 includes server systems on which execute secure applications that control access to protected resources. The secure applications executing on the Application Servers 102 may each be embodied as a Web resource (e.g. a Web site or application) having its own Uniform Resource Locator (URL) with which it is associated and through which it is accessed by Web clients using the Hyper-Text Transfer Protocol (HTTP). When the secure applications executing on Application Servers 102 receive requests to access protected resources from clients executing on User Devices 160, the secure applications use Identity Management System 108 to authenticate the users of those clients prior to granting access to the protected resources. Secure applications executing on Application Servers 102 have a "trust" relationship with Identity Management System 108, such that they rely on the contents of access tokens that are generated by Identity Management System 106 when user authentication is successful, in order to authorize access to specific protected resources that are under their control. Application Servers 102 may be embodied as or within one or more hardware server computer systems, such as, for example, within one or more rack-mounted server computers or the like. Alternatively, Application Servers 102 may be embodied as or within one or more virtual servers, such as one or more virtual private servers or the like.

While Application Servers 102 may include any specific number of servers, for purposes of concise illustration and explanation the embodiment of FIG. 1 shows Application Servers 102 including Application Server A 120 and Application Server B 140. Application Server A 120 includes Processing Circuitry 124, Communication Interfaces 126, and Memory 128. Application Server B 140 includes Processing Circuitry 144, Communication Interfaces 146, and Memory 148. Communication Interfaces 126 and 146 may include one or more network interfaces and/or interfaces to I/O devices, that enable the respective application server to communicate over one or more computer networks, including Network 118. Processing Circuitry 124 and 144 may include one or more computer processors, such as a central processing unit (CPU) or microprocessor, and associated circuitry. Memory 128 and 148 may include volatile memory (e.g., RAM) and/or non-volatile storage, and/or another type of computer readable medium, that is operable to store program code that is executable on the processing circuitry of the respective application server, and that may be operable to store data operated on by such program code. Although certain software constructs are specifically shown in Memory 128 and 148, Memory 128 and Memory 148 may also include other software constructs, which are not shown, such as an operating system and/or various other applications, and/or middleware, utilities, libraries, etc.

In the illustrative embodiment shown in FIG. 1, Memory 128 of Application Server A 120 stores Secure Application A 122, which includes and controls access to a number of Protected Resources 130, shown by Resource 1 132 through Resource N 134. Secure Application A 122 further includes an Authorization Database 136, and program code such as Multiple-Identity Authorization Logic 138. Authorization Database 136 and Multiple-Identity Authorization Logic 138 together make up a multiple-identity authorization endpoint within Secure Application A 122. Secure Application A 122 is an example of a multiple-identity secure application.

Authorization Database 136 stores access control structures, such as one or more access control lists and/or other access control structures, that are used by Multiple-Identity Authorization Logic 138 to determine scopes of access to be granted in response to the contents of access tokens received from Identity Management System 108. For example, Authorization Database 136 may maintain a set of relationships between individual authorization scopes and corresponding scopes of access that are to be granted in response to receipt of the authorization scopes in access tokens received from Identity Management System 108. Each scope of access may indicate one or more specific ones of the Protected Resources 130 that are to be made accessible in response to receipt of a corresponding authorization scope within an access token sent from Identity Management System 108. Multiple-Identity Authorization Logic 138 is operable when executed to use the contents of Authorization Database 136 to grant access to specific resources in Protected Resources 130 that are within specific scopes of access, in response to authorization scopes contained in access tokens received from Identity Management System 108.

Multiple-Identity Authorization Logic 138 may further be operable when executed to provide one or more specific authorization scopes from Authorization Database 136 to Identity Management System 108 when an alias identity is created for a user. In some embodiments, Multiple-Identity Authorization Logic 138 is operable to provide an authorization scope (e.g. from Authorization Database 136) to Identity Management System 108 when an alias identity is created at a time when Secure Application A 122 is being accessed by a user through one of the clients executing on User Devices 160, e.g. during processing of a user's initial request for access to Secure Application A 122. For example, when a user initially requests access to Secure Application A 122 using a client executing on a user device in User Devices 160, Secure Application A 122 may cause Database Entry Creation and Modification Logic 114 to add an alias identity to the user's entry in Principal Database 116. In some embodiments, Multiple-Identity Authorization Logic 138 may identify a group of users to which the user belongs, and provide an authorization scope associated with that group of users to Identity Management System 108, so that Database Creation and Modification Logic 114 can store the authorization scope for the group of users to which the user belongs into the newly created alias identity that is added to the user's entry in Principal Database 116. Authorization Database 136 may maintain a scope of access that is granted to each member of the group of users in response to receipt of an access token that contains the authorization scope for the group of users. For example, the user may be an employee of a specific business organization, and the group of users to which the user belongs may consist of all employees of that business organization. The business organization may be one of multiple business organizations that use Secure Application A 122. The scope of access that is granted to each employee of the business organization, e.g. by Multiple-Identity Authorization Logic 138 in response to receipt of an access token containing the authorization scope for employees of the business organization, may provide access to a set of protected resources in Protected Resources 130 that are accessible only to employees of that business organization. In some embodiments in which the Protected Resources 130 are electronic documents, the set of protected resources in the scope of access granted to each employee of the business organization, in response to receipt of the authorization scope for the employees of the business organization, may be electronic documents in Protected Resources 130 that are accessible only to employees of that specific business organization. In this way, different authorization scopes may be used to provide access to different sets of protected resources to employees of different business organizations that use Secure Application A 122.

In another example, the user may be located in a specific geographic region (e.g. a continent, country, state, county, or city) and the group of users to which the user belongs may consist of all users of Secure Application A 122 that are located in that geographic region. The geographic region may be one of multiple geographic regions in which users of Secure Application A 122 are located. The scope of access that is granted to each user located in the geographic region, e.g. by Multiple-Identity Authorization Logic 138 in response to receipt of an access token containing the authorization scope for users located in geographic region, may provide access to a set of protected resources in Protected Resources 130 that are accessible only users who are located in that geographic region. In some embodiments in which the Protected Resources 130 are electronic documents, the set of protected resources in the scope of access granted to each user located in the geographic region, in response to receipt of the authorization scope for the users located in the geographic region, may be electronic documents in Protected Resources 130 that are accessible only to users who are located in that geographic region. In this way, different authorization scopes may be used to provide access to different sets of protected resources to users of Secure Application A 122 who are located in different geographic regions.

Further in the illustrative embodiment shown in FIG. 1, Memory 148 of Application Server B 140 stores Secure Application B 142, which includes a number of Protected Resources 150, shown by Resource 1 152 through Resource N 154, an Authorization Database 156, and program code such as Single-Identity Authorization Logic 158. Authorization Database 156 and Single-Identity Authorization Logic 158 together make up a single-identity authorization endpoint within Secure Application B 142. Secure Application B 142 is an example of a single-identity secure application.

Authorization Database 156 stores access control structures, such as one or more access control lists and/or other access control structures, that are used by Single-Identity Authorization Logic 158 to determine authorization scopes of a user's principal identity in response to the contents of access tokens received from Identity Management System 108. For example, Authorization Database 156 may maintain a set of relationships between principal identities and corresponding sets of associated authorization scopes. Each individual principal identity may be associated with multiple authorization scopes through Authorization Database 156. Single-Identity Authorization Logic 158 operates in response to receipt of an access token from Identity Management System 108 by determining a principal identity that is indicated by the access token. An access token may, for example, indicate a principal identity by way of a principal identifier that is contained in the access token. The principal identifier may be any specific type of principal identifier that is uniquely associated with the principal identity, such as a dedicated principal identifier value, a value of an anchor attribute, a name of the corresponding user, login credentials for the principal identity, and/or some combination of such principal identity attributes and/or other specific types of principal identity attributes. After determining the principal identity indicated by a received access token, Single-Identity Authorization Logic 158 may then use Authorization Database 156 to obtain a corresponding set of authorization scopes. Authorization Database 156 may be embodied to maintain relationships between values of any specific type of principal identifier and corresponding sets of authorization scopes.

After obtaining a set of authorization scopes that corresponds to the principal identity indicated by an access token received from Identity Management System 108, Single-Identity Authorization Logic 158 may then prompt the user associated with the principal identity (who was previously authenticated by Identity Management System 108) to select one of the authorization scopes in the set. For example, Single-Identity Authorization Logic 158 may generate, in a client (e.g. Web browser) being used by the user to access Secure Application B 142, a user interface displaying a list of the authorization scopes in the set of authorization scopes corresponding to the user's principal identity, and request that the user select (e.g. click on) one authorization scope in the set that corresponds to a scope of access that contains the protected resources within Protected Resources 150 that the user wishes to access. In response to receiving the user's selection, Single-Identity Authorization Logic 158 may then grant access to the one or more specific ones of the Protected Resources 130 that are within the scope of access corresponding to the authorization scope selected by the user.

Also shown in FIG. 1 are a number of User Devices 160, which are devices used by users of the secure applications executing on Application Servers 102 (e.g. Secure Application A 122 and Secure Application B 142), in order to access the secure applications. Devices within User Devices 160 may be any specific type of device that is operable to execute Web client software (e.g. a Web browser or the like) and that is capable of accessing the secure applications executing on Application Servers 102 using HTTP. Devices within User Devices 160 may be mobile devices, such as smartphones, laptops, or tablet computers, and/or another type of user device, such as a desktop computer. Alternatively, User Devices 160 may be embodied as or within one or more virtual machines.

For purposes of explanation and concise illustration, User Devices 160 is shown including a single User Device 162, though any specific number of user devices may be used in the embodiments disclosed herein. User Device 162 includes Processing Circuitry 166, Communication Interfaces 164, and Memory 168. Communication Interfaces 164 may include one or more network interfaces and/or interfaces to I/O devices, that enable User Device 162 to communicate over one or more computer networks, including Network 118. Processing Circuitry 166 may include one or more computer processors, such as a central processing unit (CPU) or microprocessor, and associated circuitry. Memory 168 may include volatile memory (e.g., RAM) and/or non-volatile storage, and/or another type of computer readable medium, that is operable to store program code that is executable on Processing Circuitry 166, and that may be operable to store data operated on by such program code. In the illustrative embodiment of FIG. 1, Memory 168 stores Client 170, which may be embodied as a Web client or agent, such as a Web browser, that is capable of accessing the secure applications executing on Application Servers 102 using HTTP. Memory 168 may also include other software constructs, which are not shown, such as an operating system and/or various other applications, and/or middleware, utilities, libraries, etc.

Figure 2:
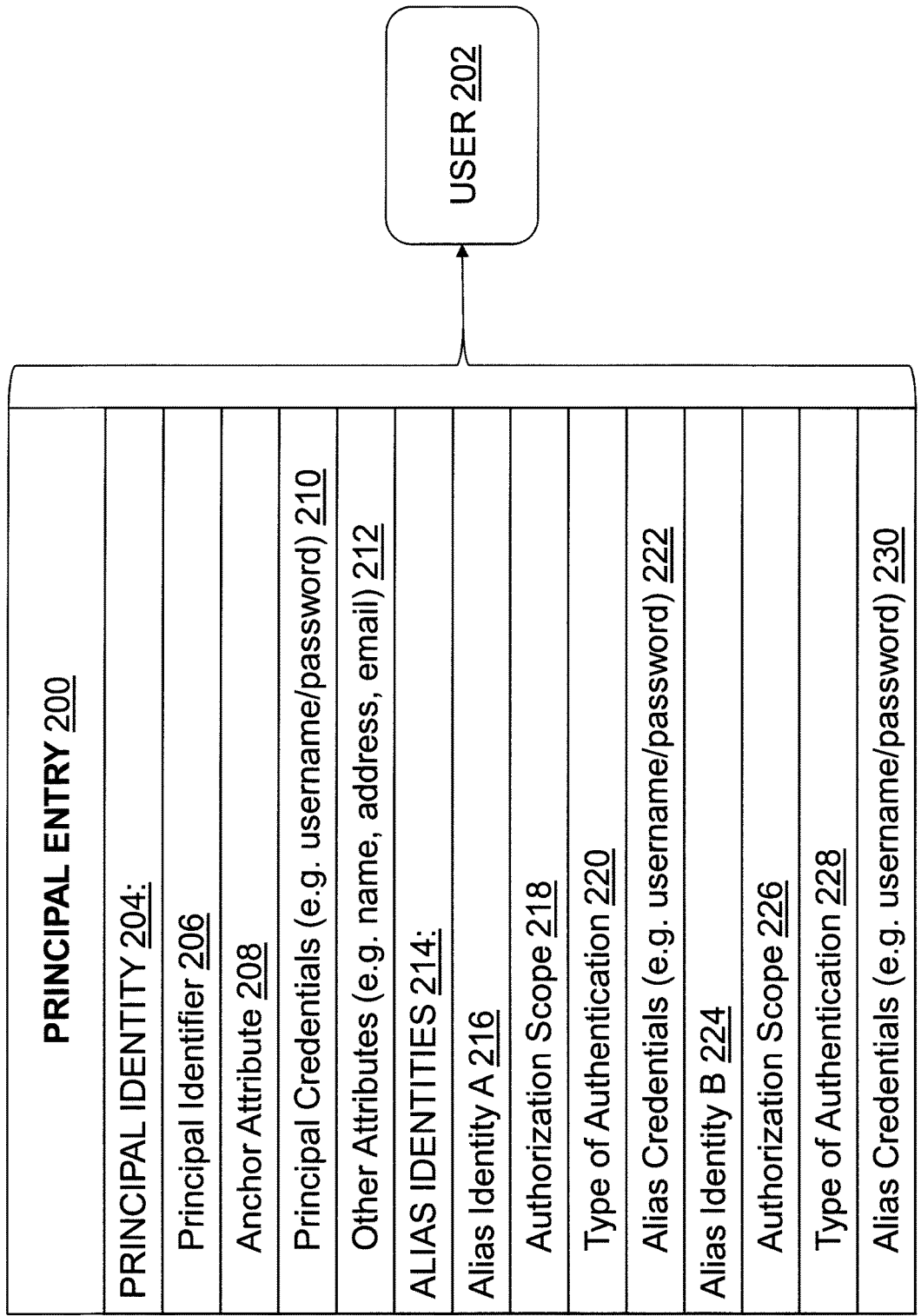
FIG. 2 is a block diagram showing an example of the structure of an entry in the principal database in an illustrative embodiment.

FIG. 2 is a block diagram showing an example of the structure of an entry in the principal database in an illustrative embodiment. As shown in FIG. 2, a Principal Entry 200 is uniquely associated with a User 202, includes a single Principal Identity 204, and may further include multiple Alias Identities 214. Principal Identity 204 includes a number of principal identity attributes, including a Principal Identifier 206, an Anchor Attribute 208, Principal Credentials 210, and Other Attributes 212. Principal Identifier 206 may be embodied as a value that is obtained from User 202 or automatically generated when Principal Entry 200 is created, that uniquely identifies Principal Identity 204, and that may be used by authorization logic in a single-identity authorization endpoint (e.g. Single-Identity Authorization Logic 158 in FIG. 1) to identify a set of authorization scopes that are associated with Principal Identity 204. Alternatively, one or more other principal identity attributes may be used as the principal identifier for the entry, such as the Anchor Attribute 208, Principal Credentials 210, and/or one or more of the Other Attributes 212.

Anchor Attribute 208 is a verified attribute that is unique to the Principal Identity 204, and that accordingly is also unique to Principal Entry 200 and User 202. The Anchor Attribute 208 may be used by Database Entry Creation and Modification Logic 114 to verify User 202 when Principal Entry 200 is created, and/or whenever the contents of Principal Entry 200 are modified. In one embodiment, User 202 must be verified based on Anchor Attribute 208 prior to addition of any alias identities to Principal Entry 200 after Principal Entry 200 is created, and User 202 must also be verified based on Anchor Attribute 208 prior to modification of any attribute of either Principal Identity 204 or Alias Identities 214.

For example, Anchor Attribute 208 may consist of or include a verified electronic mail address of User 202, and prior to any modification to Principal Entry 200, Database Entry Creation and Modification Logic 114 verifies User 202 based on Anchor Attribute 208 by sending an electronic mail message to that verified electronic mail address. The electronic mail message sent to the verified electronic mail address may contain a verification link to be selected by User 202 (e.g. a hyperlink that is to be clicked on by User 202). Database Entry Creation and Modification Logic 114 may then verify User 202 by detecting that User 202 has selected (e.g. clicked on) the link contained in the electronic mail message sent to the verified electronic mail address. In response to detecting that User 202 has selected the link contained in the electronic mail message, Database Entry Creation and Modification Logic 114 permits User 202 to modify one or more of the attributes of Principal Identity 204 or Alias Identities 214, and/or add a new alias identity to Principal Entry 200, e.g. using a client executing on one of the User Devices 160.

Alternatively, other types of anchor attributes may be used to verify User 202. For example, User 202 may instead be required to submit their social security number, present their smart card, or perform some other predetermined verifying action based on the anchor attribute prior to being permitted to modify Principal Entry 200.

Principal Credentials 210 may include or indicate credentials that must be presented by User 202 to Authentication Logic 110 for Authentication Logic 110 to authenticate User 202 on behalf of Secure Application B 142, prior to causing Access Token Generation Logic 112 to generate and send an access token to the single-identity authorization endpoint within Secure Application B 142, e.g. to Single-Identity Authorization Logic 158. For example, Principal Credentials 210 may include or consist of a user name and password that User 202 must submit through a client executing on a device within User Devices 160 in order to be authenticated by Authentication Logic 110. Alternatively, Principal Credentials 210 may describe or indicate specific factors (e.g. a password known by User 202, a shared secret/security token possessed by User 202, a biometric template of User 202, etc.) that are used by Authentication Logic 110 in a multi-factor authentication technique (e.g. two-factor authentication) to authenticate User 202, prior to causing Access Token Generation Logic 112 to generate and send an access token to Single-Identity Authorization Logic 158 within Secure Application B 142.

Other Attributes 212 may include various other information associated with Principal Identity 204, such User 202's name, User 202's address, an electronic mail address of User 202, and/or other information associated with Principal Identity 204.

While an entry in Principal Database 116 may include any specific number of alias identities, for purposes of explanation and concise illustration the example of Principal Entry 200 in FIG. 2 shows Alias Identities 214 including two alias identities—Alias Identity A 216 and Alias Identity B 224. Each one of the alias identities in Alias Identities 214 indicates an authorization scope corresponding to a scope of access with regard to protected resources contained in a multiple-identity secure application executing on Application Servers 102 (e.g. Secure Application A 122). In some embodiments, the authorization scope for an alias identity may be received from a multiple-identity secure application when the alias identity is created. An authorization scope corresponds to a scope of access in the authorization database of a multiple-identity secure application (e.g. Authorization Database 136), and may be used by authorization logic in the multiple-identity secure application (e.g. by Multiple-Identity Authorization Logic 138) to grant the corresponding scope of access to User 202 after User 202 is authenticated by Authentication Logic 110 through the authentication credentials stored in the alias identity that also contains the authorization scope. In some embodiments, the authorization scope for an alias identity may be indicated by an authorization scope name contained in an authorization scope alias identity attribute, as illustrated by Authorization Scope 218 in Alias Identity A 216 and Authorization Scope 226 in Alias Identity B 224. Alternatively, one or more other alias identity attributes may be used to indicate the authorization scope for an alias identity, such as the Alias Credentials 222 in Alias Identity A 216 and/or Alias Credentials 230 in Alias Identity B 224.

For example, Authorization Scope 218 may correspond to a first scope of access that includes a first subset of the protected resources in Protected Resources 130 of Secure Application A 122. Authorization Scope 226 may correspond to a second scope of access that includes a second subset of the Protected Resources 130 of Secure Application A 122. When User 202 requests access to Secure Application A 122, Authentication Logic 110 attempts to authenticate User 202 using an authentication technique indicated by Type of Authentication 220. In a use case in which the credentials presented by User 202 are determined to match Alias Credentials 222, then User 202 is determined to have successfully authenticated through Alias Identity A 216, and Access Token Generation Logic 112 generates an access token that contains both i) the authorization scope of Alias Identity A 216 (Authorization Scope 218), and/or one or more other alias identity attributes of Alias Identity A 216 (Type of Authentication 220 and/or Alias Credentials 222), and ii) the principal identifier of Principal Identity 204 (Principal Identifier 206) and/or one or more other principal identity attributes of Principal Identity 204 (Anchor Attribute 208 and/or Principal Credentials 210 and/or Other Attributes 212). The generated access token is sent to Multiple-Identity Authorization Logic 138, which uses Authorization Database 136 to find the scope of access that corresponds to Authorization Scope 218, and that is to be granted by Multiple-Identity Authorization Logic 138 with regard to Protected Resources 130 in response to receipt of an access token containing Authorization Scope 218.

Alternatively, in a use case in which the credentials presented by User 202 are determined by Authentication Logic 110 to match Alias Credentials 230, then User 202 is determined to have successfully authenticated through Alias Identity B 224, and Access Token Generation Logic 112 generates an access token that contains both i) the authorization scope of Alias Identity B 224 (Authorization Scope 226) and/or one or more other alias identity attributes of Alias Identity B 224 (Type of Authentication 228 and/or Alias Credentials 230), and ii) the principal identifier of Principal Identity 204 (Principal Identifier 206) and/or one or more other principal identity attributes of Principal Identity 204 (Anchor Attribute 208 and/or Principal Credentials 210 and/or Other Attributes 212). The access token is sent by Access Token Generation Logic 112 to Multiple-Identity Authorization Logic 138, which uses the Authorization Database 136 to find the scope of access corresponding to Authorization Scope 226, and that is to be granted by Multiple-Identity Authorization Logic 138 with regard to Protected Resources 130 in response to receipt of an access token containing Authorization Scope 226.

In either use case, in response to User 202 subsequently requesting access to Secure Application B 142, Authentication Logic 110 determines that an access token was previously generated for User 202 through one of the Alias Identities 214. In response to determining that an access token was previously generated for User 202 in response to authentication of User 202 using one of the Alias Identities 214, Authentication Logic 110 sends the access token to Single-Identity Authorization Logic 158 without authenticating User 202 based on Principal Credentials 210. Single-Identity Authorization Logic 158 then determines a scope of access to grant User 202 with regard to Protected Resources 150 by first identifying, in Authorization Database 156, a set of authorization scopes that are associated with Principal Identifier 206. Single-Identity Authorization Logic 158 then prompts User 202 to select one of the authorization scopes associated with the Principal Identifier 206 (e.g. through a user interface that lists the set of authorization scopes associated with Principal Identifier 206), and determines a scope of access with regard to Protected Resources 150 that corresponds to the authorization scope that was selected by User 202, and that is to be granted to User 202 by Single-Identity Authorization Logic 158 in response to User 202 selecting the authorization scope.

The type of authentication for an alias identity indicates how User 202 must be authenticated through the alias identity. The type of authentication for an alias identity may reflect specific authentication requirements received from the multiple-identity secure application that contains the protected resources to which access is authorized based on the authorization scope contained in the alias identity. For example, Type of Authentication 220 in Alias Identity A 216 may indicate a type of authentication that was received from Secure Application A 122 at the time Alias Identity A 216 was created, and that must be performed by Authentication Logic 110 with regard to User 202 prior to causing Access Token Generation Logic 112 to generate an access token containing Authorization Scope 218 and send the generated access token to Multiple-Identity Authorization Logic 138. Similarly, Type of Authentication 228 in Alias Identity B 224 may indicate a type of authentication that was received from Secure Application A 122 when Alias Identity B 224 was created, and that must be performed by Authentication Logic 110 with regard to User 202 prior to causing Access Token Generation Logic 112 to generate an access token containing Authorization Scope 226 and send the generated access token to Multiple-Identity Authorization Logic 138. Different types of authentication may be sent from Secure Application A 122 to Database Entry Creation and Modification Logic 114 for different authorization scopes. This allows, for example, Secure Application A 122 to require different types of authentication for users within different groups of users, e.g. different types of authentication for users who are employees of different business organizations, and/or different types of authentication for users who are located in different geographic regions.

The types of authentication that may be required through Type of Authentication 220 and Type of Authentication 228 may include specific authentication techniques (login based on username and password, multi-factor authentication, etc.), specific password strength and management requirements, and/or other types of authentication requirements that may be received from Secure Application A 122. For example, Type of Authentication 220 and/or Type of Authentication 228 may indicate password strength requirements such as minimum password length requirements, password character type requirements (e.g. capitalization and/or numeric character requirements), and/or password management requirements such as restrictions on password re-use (preventing re-use of previous passwords used within a specified preceding time period), password expiration time periods (indicating a time period after which a new password must be defined), and/or other specific requirements.

Figure 3:
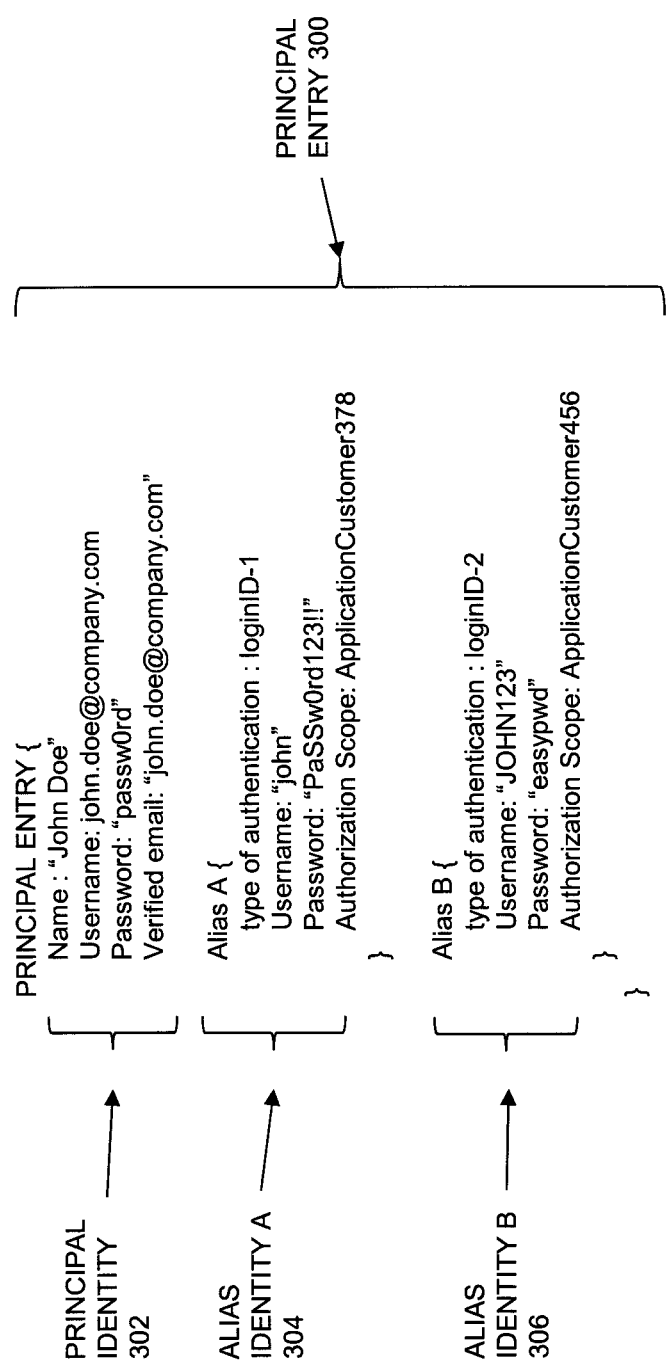
FIG. 3 is a diagram showing an example of the contents of an entry in the principal database in an illustrative embodiment.

FIG. 3 is a diagram showing an example of the contents of an entry in the Principal Database 116 in an illustrative embodiment. The Principal Entry 300 of FIG. 3 includes a Principal Identity 302, an Alias Identity 304, and an Alias Identity 306. Principal Identity 302 is shown having principal identity attributes including a "Name" attribute having a value of "John Doe", a "Username" attribute having a value of "john.doe@company.com", a "Password" attribute having a value of "passwo0rd", and a "Verified email" attribute having a value of "john.doe@company.com". The "Verified email" attribute is an example of the Anchor Attribute 208 in FIG. 2. The "Username" and "Password" attributes together are an example of the Principal Credentials 210 attribute in FIG. 2. The "Name" attribute is an example of the Principal Identifier 206 attribute in FIG. 2.

Alias Identity A 304 has alias identity attributes including a "type of authentication" attribute having a value of "loginID-1", a "Username" attribute having a value of "john", a "Password" attribute having a value of "PaSSw0rd123!!", and an "Authorization Scope" attribute having a value of "ApplicationCustomer378". The "type of authentication" attribute is an example of the Type of Authentication 220 attribute in FIG. 2. The "Username" and "Password" attributes together are an example of the Alias Credentials 222 attribute in FIG. 2. The "Authorization Scope" attribute is an example of the Authorization Scope 218 attribute in FIG. 2.

Alias Identity B 306 has alias identity attributes including a "type of authentication" attribute having a value of "loginID-1", a "Username" attribute having a value of "JOHN123", a "Password" attribute having a value of "easypwd", and an "Authorization Scope" attribute having a value of "ApplicationCustomer456". The "type of authentication" attribute is an example of the Type of Authentication 228 attribute in FIG. 2. The "Username" and "Password" attributes together are an example of the Alias Credentials 230 attribute in FIG. 2. The "Authorization Scope" attribute is an example of the Authorization Scope 226 attribute in FIG. 2.

In the example of FIG. 3, the corresponding user may be authenticated through Principal Identity 302 by submitting credentials consisting of the username "john.doe@company.com" and the password "passw0rd".

In response to a request to modify any attribute of Principal Entry 300, or to a request to add an alias identity to Principal Entry 300, Database Entry Creation and Modification Logic 114 verifies that the request is being made by the user corresponding to Principal Entry 300 by sending an electronic mail message to the electronic mail address of john.doe@company.com that includes a hyperlink that must be clicked on by the user.

In the example of FIG. 3, the value of the "type of authentication" attribute for Alias Identity A 304 ("loginID-1") differs from the value of the "type of authentication" attribute for Alias Identity B 306 ("loginID-2"). Accordingly, for example, Alias Identity A 304 and Alias Identity B 306 have different password strength requirements. For example, the "type of authentication" attribute value of "loginID-1" may indicate that passwords for Alias Identity A 304 must be at least 12 characters long, and must contain at least one capital letter, at least one number, and at least one punctuation mark. The "type of authentication" attribute value of "loginID-2" may indicate only that passwords for Alias Identity B 306 must be at least 6 characters long. Accordingly, the password "PaSSw0rd123!!" meets the password strength requirements for Alias Identity A 304, and the password "easypwd" meets the password strength requirements for Alias Identity B 306.

Figure 4:
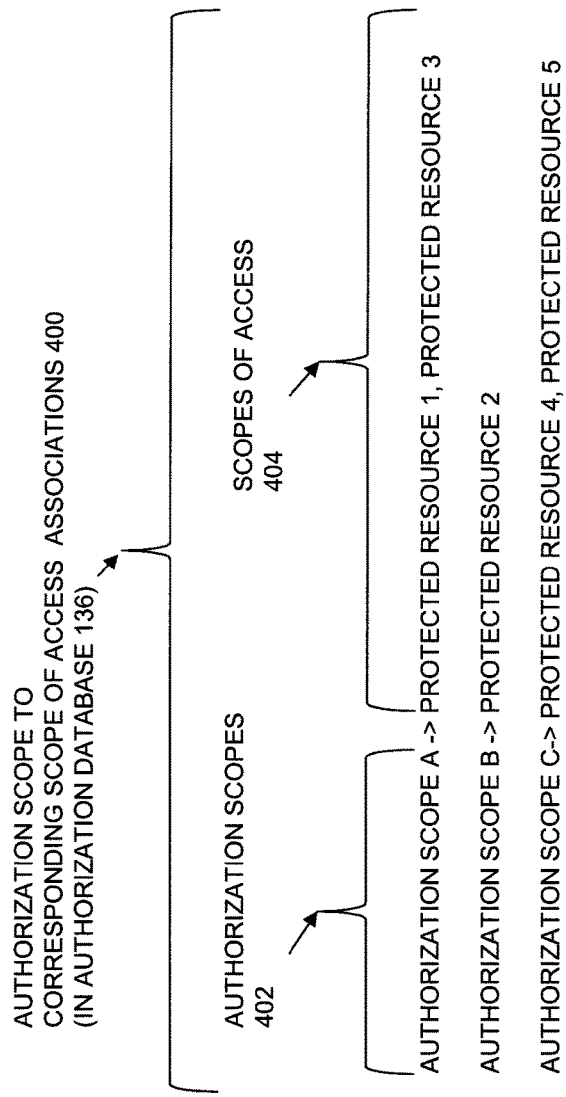
FIG. 4 shows an example of associations between authorization scopes and scopes of access that may be maintained in an authorization database of a multiple-identity authorization endpoint in an illustrative embodiment.

FIG. 4 shows an example of associations between authorization scopes and corresponding scopes of access that may be maintained in an authorization database of a multiple-identity authorization endpoint in an illustrative embodiment. For example, the Authorization Scope to Corresponding Scope of Access Associations 400 may be stored in the Authorization Database 136 of Secure Application A 122 shown in FIG. 1. In the example of FIG. 4, each one of the authorization scopes in Authorization Scopes 402 corresponds to one of the scopes of access in Scopes of Access 404. Authorization Scope A is shown corresponding to a scope of access that includes Protected Resource 1 and Protected Resource 3 within Protected Resources 130. Accordingly, in response to receipt of an access token containing Authorization Scope A, Multiple-Identity Authorization Logic 138 will grant access to Protected Resource 1 and Protected Resource 3. Authorization Scope B is shown corresponding to a scope of access that includes Protected Resource 2 within Protected Resources 130. Accordingly, in response to receipt of an access token containing Authorization Scope B, Multiple-Identity Authorization Logic 138 will grant access to Protected Resource 2. Authorization Scope C is shown corresponding to a scope of access that includes Protected Resource 4 and Protected Resource 5 within Protected Resources 130. Accordingly, in response to receipt of an access token containing Authorization Scope C, Multiple-Identity Authorization Logic 138 will grant access to Protected Resource 4 and Protected Resource 5.

Figure 5:
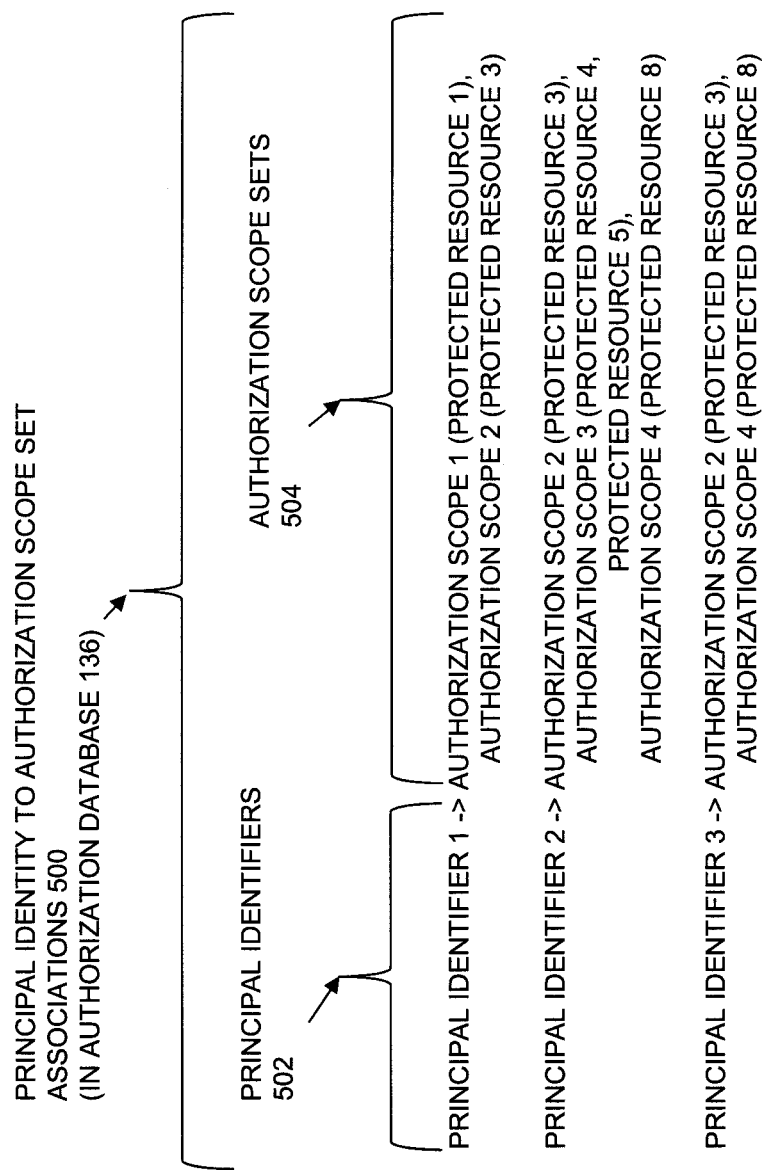
FIG. 5 shows an example of associations between principal identities and sets of authorization scopes that may be maintained in an authorization database of a single-identity authorization endpoint in an illustrative embodiment.

FIG. 5 shows an example of associations between principal identities and corresponding sets of authorization scopes that may be maintained in an authorization database of a single-identity authorization endpoint in an illustrative embodiment. In the example of FIG. 5 Principal Identity to Authorization Scope Set Associations 500 are provided by relationships between individual principal identifiers in Principal Identifiers 502 and corresponding sets of authorization scopes in Authorization Scope Sets 504. Principal Identity to Authorization Scope Set Associations 500 may, for example be stored in Authorization Database 156.

Principal Identifier 1 is shown corresponding to a set of authorization scopes that includes Authorization Scope 1 and Authorization Scope 2. Authorization Scope 1 corresponds to a scope of access that includes Protected Resource 1, and Authorization Scope 2 corresponds to a scope of access that includes Protected Resource 3. Accordingly, upon receipt of an access token containing Principal Identifier 1, Single-Identity Authorization Logic 158 displays a user interface to the user associated with the entry containing the principal identity uniquely identified by Principal Identifier 1 that displays Authorization Scope 1 and Authorization Scope 2, and asks the user to select one of Authorization Scope 1 or Authorization Scope 2. In the case where the user desires to access Protected Resource 1, the user selects Authorization Scope 1. In the case where the user desires to access Protected Resource 3, the user selects Authorization Scope 2. In response to the user selecting Authorization Scope 1, Single-Identity Authorization Logic 158 grants access to Protected Resource 1. In response to the user selecting Authorization Scope 2, Single-Identity Authorization Logic 158 grants access to Protected Resource 3.

Principal Identifier 2 is shown corresponding to a set of authorization scopes that includes Authorization Scope 2, Authorization Scope 3, and Authorization Scope 4. Authorization Scope 2 corresponds to a scope of access that includes Protected Resource 3, Authorization Scope 3 corresponds to a scope of access that includes Protected Resource 4 and Protected Resource 5, and Authorization Scope 4 corresponds to a scope of access that includes Protected Resource 8. Accordingly, upon receipt of an access token containing Principal Identifier 2, Single-Identity Authorization Logic 158 displays a user interface to the user associated with the entry containing the principal identity uniquely identified by Principal Identifier 2 that displays Authorization Scope 2, Authorization Scope 3, and Authorization Scope 4, and asks the user to select one of Authorization Scope 2, Authorization Scope 3, or Authorization Scope 4. In the case where the user desires to access Protected Resource 3, the user selects Authorization Scope 2. In the case where the user desires to access Protected Resource 4 or Protected Resource 5, the user selects Authorization Scope 3. In the case where the user desires to access Protected Resource 8, the user selects Authorization Scope 4. In response to the user selecting Authorization Scope 2, Single-Identity Authorization Logic 158 grants access to Protected Resource 3. In response to the user selecting Authorization Scope 3, Single-Identity Authorization Logic 158 grants access to Protected Resource 4 and Protected Resource 5. In response to the user selecting Authorization Scope 4, Single-Identity Authorization Logic 158 grants access to Protected Resource 8.

Principal Identifier 3 is shown corresponding to a set of authorization scopes that includes Authorization Scope 2 and Authorization Scope 4. Authorization Scope 2 corresponds to a scope of access that includes Protected Resource 3, and Authorization Scope 4 corresponds to a scope of access that includes Protected Resource 8. Accordingly, upon receipt of an access token containing Principal Identifier 3, Single-Identity Authorization Logic 158 displays a user interface to the user associated with the entry containing the principal identity uniquely identified by Principal Identifier 1 that displays Authorization Scope 2 and Authorization Scope 4, and asks the user to select one of Authorization Scope 2 or Authorization Scope 4. In the case where the user desires to access Protected Resource 3, the user selects Authorization Scope 2. In the case where the user desires to access Protected Resource 8, the user selects Authorization Scope 4. In response to the user selecting Authorization Scope 2, Single-Identity Authorization Logic 158 grants access to Protected Resource 3. In response to the user selecting Authorization Scope 4, Single-Identity Authorization Logic 158 grants access to Protected Resource 8.

Figure 6:
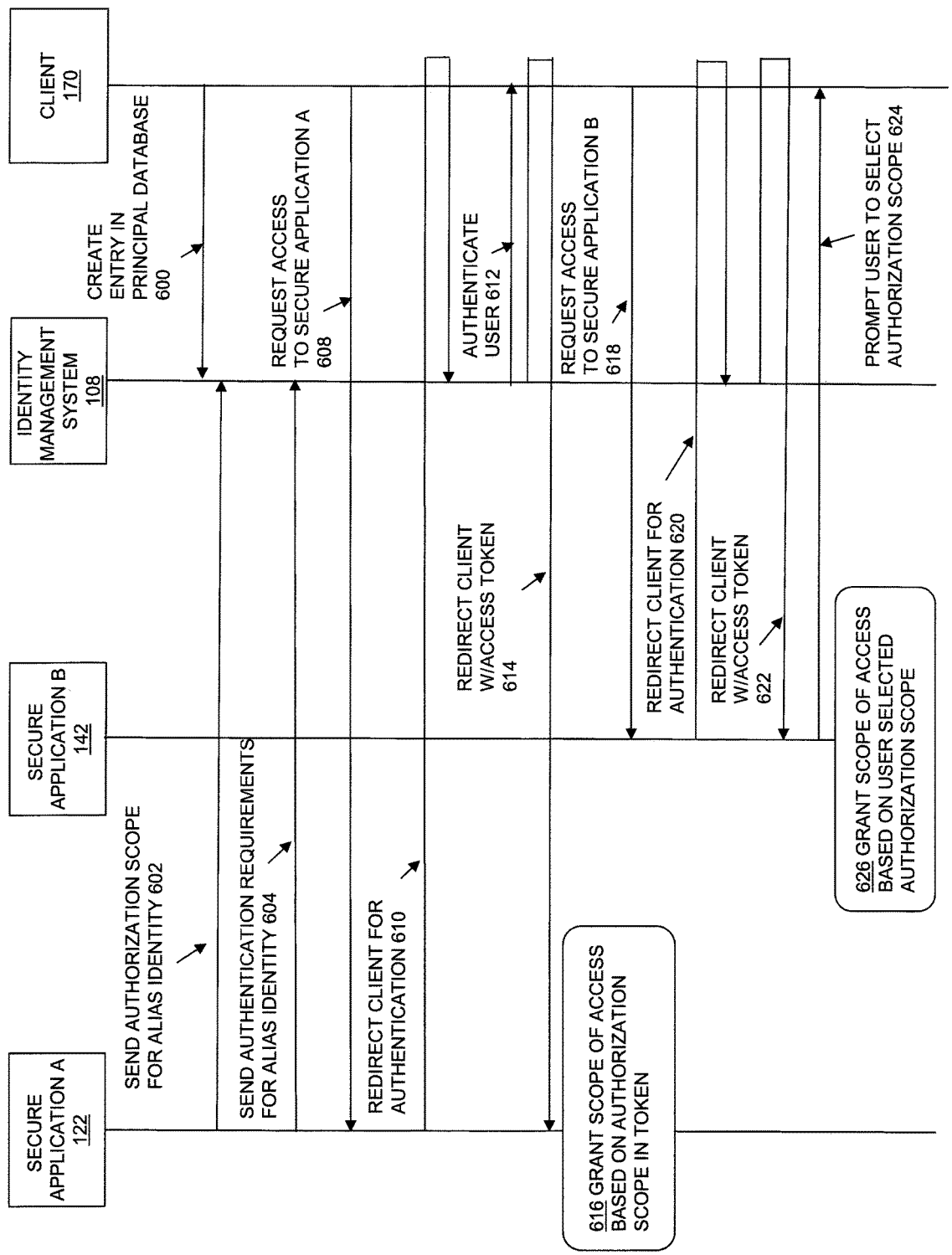
FIG. 6 is a sequence diagram showing an example of operation for an illustrative embodiment.

FIG. 6 is a sequence diagram showing an example of operation for an illustrative embodiment, with reference to Secure Application A 122, Secure Application B 142, Identity Management System 108 and Client 170 shown in FIG. 1. In the example of FIG. 6, Identity Management System 108 provides a principal database (e.g. Principal Database 116 in FIG. 1) in which each entry is associated with a respective user of a set of secure applications that includes Secure Application A 122 and Secure Application B 142. At 600 an entry is created in the principal database for a user of Secure Application A 122 and Secure Application B 142. The entry is created at 600 by Identity Management System 108 storing a principal identity and an alias identity into the entry. For example, a principal identity may be stored into the entry when the user initially registers with Identity Management System 108 using Client 170. The principal entity has principal identity attributes that may include a principal identifier and login credentials, some or all of which may be obtained from the user through Client 170. Subsequently, an alias identity for the user may be added to the entry, e.g. when the user initially navigates Client 170 to Secure Application A 122. In response to the user initially navigating Client 170 to Secure Application A 122, e.g. by navigating Client 170 to Secure Application A 122 by way of a URL associated with Secure Application A 122, Secure Application A 122 may cause Identity Management System 108 to add the alias identity to the user's entry in the principal database (e.g. by redirecting Client 170 to Identity Management System 108). For example, in response to the user is initially accessing Secure Application A 122 using Client 170, at 602 Secure Application A 122 may send an authorization scope that is to be included in the alias identity to be added, and at 604 Secure Application A 122 may send authentication requirements to be applied by Identity Management System 108 when the user is authenticated through that alias identity. In response to receipt of the authorization scope at 602, and to receipt of the authentication requirements at 604, Identity Management System 108 stores an alias identity containing the received authorization scope and the received authentication requirements into the user's entry in the principal database. In addition to the authorization scope and authentication requirements, the alias identity may include login credentials that meet the received authentication requirements. Such login credentials stored in the alias identity may, for example, be received from the user through Client 170.

After creation of the user's entry in the principal database at 600, at 608 the user subsequently requests access to Secure Application A 122, e.g. again by navigating Client 170 to Secure Application A 122 by way of a URL associated with Secure Application A 122. In response to the access request (e.g. in response to an HTTP GET request received from Client 170), at 610 Secure Application A 122 redirects Client 170 to Identity Management System 108, in order for Identity Management System 108 to authenticate the user on behalf of Secure Application A 122, based on the login credentials contained in the alias identity. At 612 Identity Management System 108 authenticates the user by requesting that the user supply login credentials through Client 170, and then comparing the credentials received through Client 170 to the login credentials stored in the alias identity in the user's entry in the principal database. If there is a match, then the user is successfully authenticated. In response to successfully authenticating the user on behalf of Secure Application A 122 at 612 based on the login credentials contained the alias identity of the user's entry in the principal database, Identity Management System 108 generates an access token that contains the attributes of both the alias identity and the principal identity contained in the user's entry in the principal database. The access token generated by Identity Management System 108 is transmitted to an authorization endpoint in Secure Application A 122 at 614 when Identity Management System 108 redirects Client 170 to Secure Application A 122.

At 616 the access token transmitted from Identity Management System 108 to Secure Application A 122 at 614 causes the authorization endpoint in Secure Application A 122 to grant, based on the authorization scope attribute from the alias identity, a scope of access to at least some of the protected resources contained in Secure Application A 122. The user is then permitted to access, e.g. using Client 170, those protected resources of Secure Application A 122 that are within the granted scope of access.

At 618 the user subsequently requests access to Secure Application B 142, e.g. by navigating Client 170 to Secure Application B 142 by way of a URL associated with Secure Application B 142. In response to the access request (e.g. in response to an HTTP GET request received from Client 170), at 620 Secure Application B 142 redirects Client 170 to Identity Management System 108, in order for Identity Management System 108 to authenticate the user on behalf of Secure Application B 142, based on the login credentials contained in the principal identity of the user's entry in the principal database. In response to Client 170 being redirected at 620, Identity Management System 108 determines that an access token was previously generated when the user was authenticated at 612 through the alias identity. In response to determining that the access token was previously generated, and without authenticating the user based on the login credentials for the principal identity, at 622 Identity Management System 108 redirects Client 170 to Secure Application B 142, with the previously generated access token. In this way the previously generated access token is transmitted to an authorization endpoint in Secure Application B 142. The access token transmitted to Secure Application B 142 at 622 causes the authorization endpoint in Secure Application B 142 to grant, based on the principal identifier of the principal identity, a scope of access with regard to protected resources in Secure Application B 142. In some embodiments, the authorization endpoint in Secure Application B 142 may retrieve a set of authorization scopes that corresponds to the principal identifier of the principal identity, and at 624 prompt the user to select one of the authorization scopes in the set of authorization scopes that corresponds to the principal identifier of the principal identity. For example, at 624 the authorization endpoint in Secure Application B 142 may generate a user interface in Client 170 that lists the authorization scopes in the set of authorization scopes corresponding to the principal identifier of the principal identity, and prompt the user to select one of the authorization scopes in the set. At 626 the authorization endpoint in Secure Application B 142 grants a scope of access with regard to protected resources in Secure Application B 142 that is associated with the authorization scope that was selected by the user. The user is then permitted to access those protected resources of Secure Application B 142 that are within the granted scope of access through Client 170.

Figure 7:
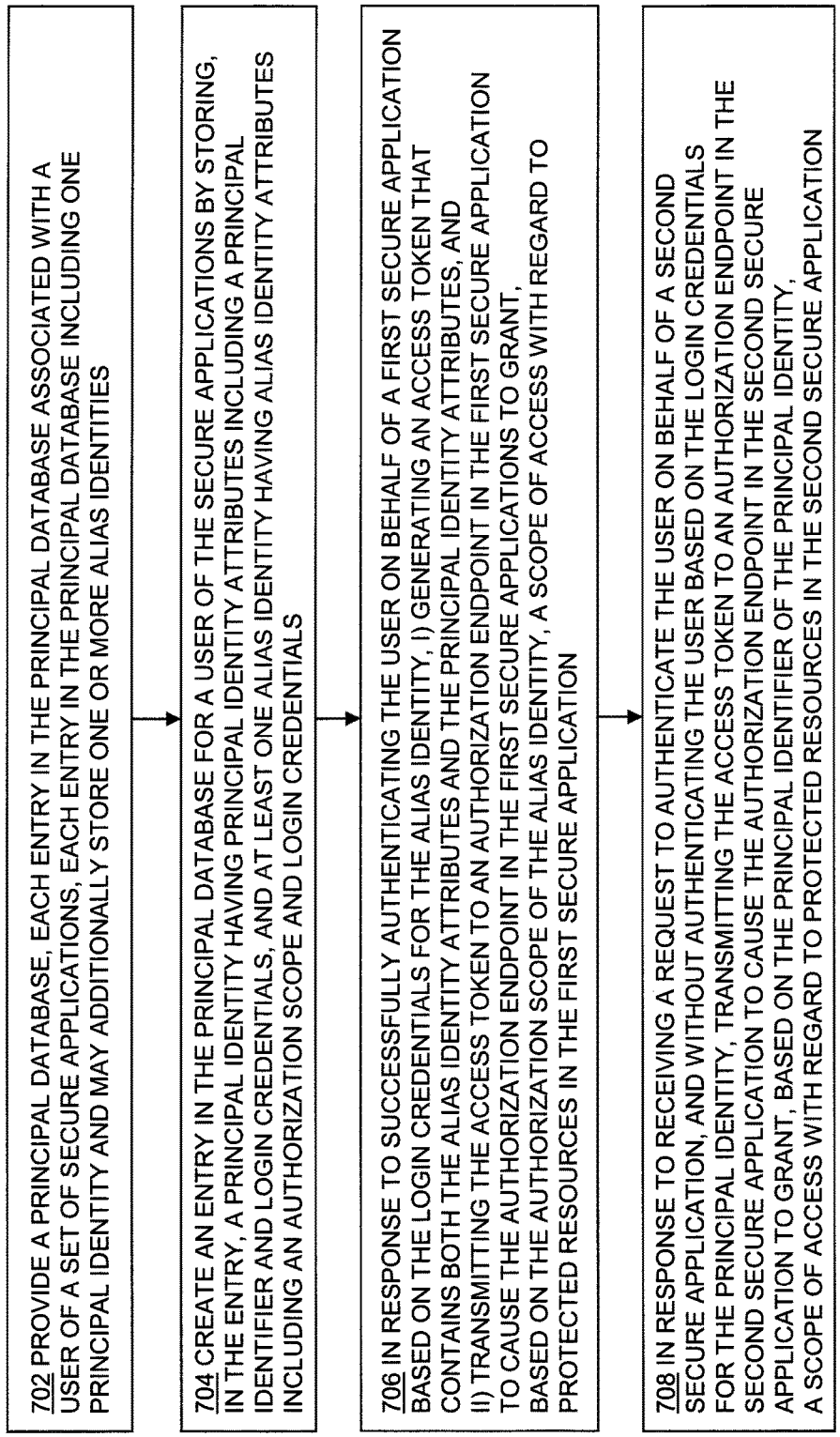
FIG. 7 is a first flow chart showing a first example of steps performed during operation of some embodiments.

FIG. 7 is a flow chart showing a first example of steps performed during operation of some embodiments. In step 702 a principal database is provided, in which each entry is associated with a corresponding user who is one of a set of users of a set of secure applications. Each entry in the principal database includes one principal identity and may additionally store one or more alias identities.

In step 704 an entry in the principal database is created for a user of the secure applications by storing, in the entry, a principal identity having principal identity attributes including a principal identifier and login credentials, and at least one alias identity having alias identity attributes including an authorization scope and login credentials.

In step 706, in response to successfully authenticating the user on behalf of a first secure application based on the login credentials for the alias identity, an access token is generated that contains both the alias identity attributes and the principal identity attributes. The access token is transmitted to an authorization endpoint in the first secure application to cause the authorization endpoint in the first secure applications to grant, based on the authorization scope of the alias identity, a scope of access with regard to protected resources in the first secure application.

In step 708, in response to receiving a request to authenticate the user on behalf of a second secure application, and without authenticating the user based on the login credentials for the principal identity, the access token is transmitted to an authorization endpoint in the second secure application to cause the authorization endpoint in the second secure application to grant, based on the principal identifier of the principal identity, a scope of access with regard to protected resources in the second secure application.

Figure 8:
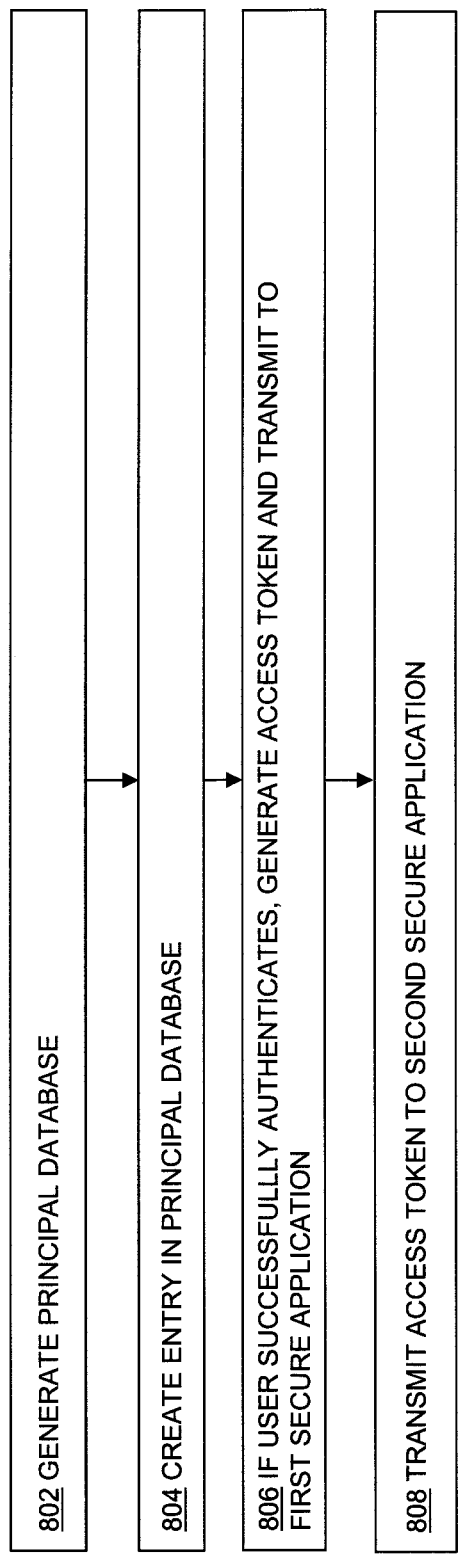
FIG. 8 is a second flow chart showing a second example of steps performed during operation of some embodiments.

FIG. 8 is a flow chart showing a second example of steps performed during operation of some embodiments. In step 802 a principal database is generated for a set of secure applications. In step 804 an entry in the principal database is created for a user of the secure applications. In step 806, if the user is successfully authenticated based on an alias identity of the user, an access token is generated and transmitted to a first secure application. In step 808, the access token is transmitted to a second secure application with an indication of a principal identity of the user.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above.

Aspects of the technologies disclosed herein may be embodied as a system, method or computer program product. Accordingly, elements described herein may be embodied using hardware, software (including firmware, resident software, micro-code, etc.) or a combination of software and hardware. Furthermore, aspects of the embodiments illustrated herein may take the form of a computer program product embodied at least in part in one or more non-transitory computer readable storage medium(s) having computer readable program code stored thereon for causing one or more processors and/or a computer system to carry out those aspects.

Any combination of one or more non-transitory computer readable storage medium(s) may be utilized. Examples of a non-transitory computer readable storage medium include, but are not limited to, an optical disc (e.g. CD or DVD), an optical storage device, a magnetic disk, a magnetic storage device, a random access memory (RAM), a read-only memory (ROM), an erasable programmable read-only memory (EPROM or Flash memory), and/or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

It will be understood by those of ordinary skill in the art that modification to and variation of the illustrated embodiments may be made without departing from the inventive concepts described herein.

What is claimed is:

1. A method of providing identity management, comprising:
    in response to successfully authenticating a user on behalf of a first one of a plurality of secure applications based on login credentials for an alias identity associated with the user,
        i) generating an access token that contains both alias identity attributes for the alias identity and principal identity attributes for a principal identity that is also associated with the user, wherein the alias identity attributes include the login credentials for the alias identity and an authorization scope of the alias identity, and wherein the principal identity attributes include a principal identifier and login credentials for the principal identity, and
        ii) transmitting the access token to an authorization endpoint in the first one of the secure applications to cause the authorization endpoint in the first one of the secure applications to grant, based on an authorization scope of the alias identity, a scope of access with regard to protected resources in the first one of the secure applications; and
    in response to receiving a request to authenticate the user on behalf of a second one of the secure applications, and without authenticating the user based on the login credentials for the principal identity, transmitting the access token to an authorization endpoint in the second one of the secure applications to cause the authorization endpoint in the second one of the secure applications to grant, based on the principal identifier of the principal identity, a scope of access with regard to protected resources in the second one of the secure applications.

2. The method of claim 1, wherein the authorization endpoint in the second secure application determines the scope of access with regard to the protected resources in the second one of the secure applications by i) identifying, in the authorization endpoint in the second secure application, a plurality of authorization scopes associated with the principal identity, ii) prompting the user to select one of the plurality of authorization scopes associated with the principal identity, and iii) granting a scope of access to the protected resources in the second one of the secure application that is associated with an authorization scope associated with the principal identity that was selected by the user.

3. The method of claim 2, wherein the authorization scope for the alias identity comprises an authorization scope for a group of users that includes the user; and
    wherein the authorization endpoint in the first one of the secure applications maintains a scope of access that is granted, with regard to protected resources within the first one of the secure applications, to each member of the group of users in response to receipt of an access token that contains the authorization scope that identifies the group of users.

4. The method of claim 3, wherein the group of users comprises employees of a specific business organization that is one of a plurality of business organizations that use the first one of the secure applications; and
    wherein the scope of access granted to each member of the group of users in response to receipt of an access token that contains the authorization scope that identifies the group of users comprises access to a set of protected resources in the first one of the secure applications, wherein the set of protected resources in the first one of the secure applications comprises protected resources in the first one of the secure application that are only accessible to the specific business organization.

5. The method of claim 4, wherein the protected resources in the first one of the secure applications comprise a plurality of electronic documents; and
    wherein the set of the protected resources in the first one of the secure applications comprises electronic documents that are accessible only to employees of the specific business organization.

6. The method of claim 3, wherein the group of users comprises users who are located in a specific geographic region that is one of a plurality of geographic regions in which users are located that use the first one of the secure applications; and wherein the scope of access granted to each member of the group of users in response to receipt of an access token that contains the authorization scope that identifies the group of users comprises access to a set of protected resources in the first one of the secure applications, wherein the set of protected resources in the first one of the secure applications comprises protected resources in the first one of the secure applications that are accessible only to users who are located in the specific geographic region.

7. The method of claim 6, wherein the protected resources in the first one of the secure applications comprise a plurality of electronic documents; and wherein the subset of the protected resources in the first one of the secure applications comprises electronic documents that are accessible only to users that are located in the geographic region.

8. The method of claim 1, further comprising:

storing the alias identity in an entry for the user in a database while the user is accessing the first one of the secure applications during a first time period;

wherein storing the alias identity in the entry includes receiving the authentication scope from the first one of the secure applications and storing the authentication scope received from the first one of the secure applications in the entry; and wherein authenticating the user on behalf of the first one of the secure applications is performed in response to the user requesting access to the first one of the secure applications during a second time period that is subsequent to the first time period.

9. The method of claim 8 wherein the principal attributes further include at least one unique anchor attribute; and wherein modifying the entry in the database includes verifying the user based on the unique anchor attribute.

10. The method of claim 9, wherein the unique anchor attribute comprises a verified electronic mail address; and wherein verifying the user based on the unique anchor attribute comprises i) sending an electronic mail message to the electronic mail address that contains a verification link, and ii) detecting selection of the verification link in the electronic mail message by the user.

11. The method of claim 1, further comprising:

storing a plurality of alias identities in the entry, wherein each of the alias identities has alias identity attributes including login credentials; and displaying a user interface to the user through which the user can modify both the principal identity attributes and the alias identity attributes of each one of the plurality of alias identities stored in the entry.

12. A system for providing identity management, comprising:

an identity management server having processing circuitry and memory communicably coupled to the processing circuitry, the memory storing program code, wherein the program code, when executed by the processing circuitry, causes the processing circuitry to:

in response to successful authentication of a user on behalf of a first one of a plurality of secure applications based on login credentials for an alias identity associated with the user, i) generate an access token that contains both alias identity attributes for the alias identity and principal identity attributes for a principal identity that is also associated with the user, wherein the alias identity attributes include the login credentials for the alias identity and an authorization scope of the alias identity, and wherein the principal identity attributes include a principal identifier and login credentials for the principal identity, and ii) transmit the access token to an authorization endpoint in the first one of the secure applications to cause the authorization endpoint in the first one of the secure applications to grant, based on an authorization scope of the alias identity, a scope of access with regard to protected resources in the first one of the secure applications; and in response to receipt of a request to authenticate the user on behalf of a second one of the secure applications, and without authenticating the user based on the login credentials for the principal identity, transmit the access token to an authorization endpoint in the second one of the secure applications to cause the authorization endpoint in the second one of the secure applications to grant, based on the principal identifier of the principal identity, a scope of access with regard to protected resources in the second one of the secure applications.

13. The system of claim 12, wherein the authorization endpoint in the second secure application is operable to determine the scope of access with regard to the protected resources in the second one of the secure applications by i) identifying, in the authorization endpoint in the second secure application, a plurality of authorization scopes associated with the principal identity, ii) prompting the user to select one of the plurality of authorization scopes associated with the principal identity, and iii) granting a scope of access to the protected resources in the second one of the secure application that is associated with an authorization scope associated with the principal identity that was selected by the user.

14. The system of claim 13, wherein the authorization scope for the alias identity comprises an authorization scope for a group of users that includes the user; and wherein the authorization endpoint in the first one of the secure applications maintains a scope of access that is granted, with regard to protected resources within the first one of the secure applications, to each member of the group of users in response to receipt of an access token that contains the authorization scope that identifies the group of users.

15. The system of claim 14, wherein the group of users comprises employees of a specific business organization that is one of a plurality of business organizations that use the first one of the secure applications; and wherein the scope of access granted to each member of the group of users in response to receipt of an access token that contains the authorization scope that identifies the group of users comprises access to a set of protected resources in the first one of the secure applications, wherein the set of protected resources in the first one of the secure applications comprises protected resources in the first one of the secure application that are only accessible to the specific business organization.

16. The system of claim 15, wherein the protected resources in the first one of the secure applications comprise a plurality of electronic documents; and wherein the set of the protected resources in the first one of the secure applications comprises electronic documents that are accessible only to employees of the specific business organization.

17. The system of claim 14, wherein the group of users comprises users who are located in a specific geographic region that is one of a plurality of geographic regions in which users are located that use the first one of the secure applications; and wherein the scope of access granted to each member of the group of users in response to receipt of an access token that contains the authorization scope that identifies the group of users comprises access to a set of protected resources in the first one of the secure applications, wherein the set of protected resources in the first one of the secure applications comprises protected resources in the first one of the secure applications that are accessible only to users who are located in the specific geographic region.

18. The system of claim 17, wherein the protected resources in the first one of the secure applications comprise a plurality of electronic documents; and wherein the subset of the protected resources in the first one of the secure applications comprises electronic documents that are accessible only to users that are located in the geographic region.

19. The system of claim 1, wherein the program code, when executed by the processing circuitry, further causes the processing circuitry to:

store the alias identity in an entry for the user in a database in response to the user accessing the first one of the secure applications during a first time period, wherein the alias identity stored in the entry comprises an authentication scope received from the first one of the secure applications; and authenticate the user on behalf of the first one of the secure applications in response to the user requesting access to the first one of the secure applications during a second time period that is subsequent to the first time period.

20. The system of claim 19 wherein the principal attributes further include at least one unique anchor attribute, and wherein the program code, when executed by the processing circuitry, further causes the processing circuitry to verify the user based on the unique anchor attribute prior to modifying the entry in the database.

21. The system of claim 20, wherein the unique anchor attribute comprises a verified electronic mail address; and wherein the program code, when executed by the processing circuitry, further causes the processing circuitry to verify the user based on the unique anchor attribute at least in part by i) sending an electronic mail message to the electronic mail address that contains a verification link, and ii) detecting selection of the verification link in the electronic mail message by the user.

22. The system of claim 12, wherein the program code, when executed by the processing circuitry, further causes the processing circuitry to:

store a plurality of alias identities in the entry, wherein each of the alias identities has alias identity attributes including login credentials; and display a user interface to the user through which the user can modify both the principal identity attributes and the alias identity attributes of each one of the plurality of alias identities stored in the entry.

23. A non-transitory computer readable medium storing program code for providing identity management, wherein the program code, when executed by at least one processor, causes the processor to perform a method of:

in response to successfully authenticating a user on behalf of a first one of a plurality of secure applications based on login credentials for an alias identity associated with the user, i) generating an access token that contains both alias identity attributes for the alias identity and principal identity attributes for a principal identity that is also associated with the user, wherein the alias identity attributes include the login credentials for the alias identity and an authorization scope of the alias identity, and wherein the principal identity attributes include a principal identifier and login credentials for the principal identity, and ii) transmitting the access token to an authorization endpoint in the first one of the secure applications to cause the authorization endpoint in the first one of the secure applications to grant, based on an authorization scope of the alias identity, a scope of access with regard to protected resources in the first one of the secure applications; and in response to receiving a request to authenticate the user on behalf of a second one of the secure applications, and without authenticating the user based on the login credentials for the principal identity, transmitting the access token to an authorization endpoint in the second one of the secure applications to cause the authorization endpoint in the second one of the secure applications to grant, based on the principal identifier of the principal identity, a scope of access with regard to protected resources in the second one of the secure applications.

24. The method of claim 1, wherein the authorization endpoint in the first one of the secure applications grants the scope of access with regard to protected resources in the first one of the secure applications based in part on a scope of access granted to each member of a group of users that includes the user.

25. The method of claim 1, wherein the authorization endpoint in the second one of the secure applications grants the scope of access with regard to the protected resources in the second one of the secure applications based in part on user selection of one of a plurality of authorization scopes associated with the principal identity.

* * * * *